(12) United States Patent
Lardieri et al.

(10) Patent No.: US 12,369,524 B2
(45) Date of Patent: Jul. 29, 2025

(54) BATTERY SYSTEM, POWER EQUIPMENT APPARATUS HAVING THE SAME, AND ELECTRIC LAWNMOWER

(71) Applicant: Honda Motor Co., Ltd., Tokyo (JP)

(72) Inventors: Lawrence J. Lardieri, Greensboro, NC (US); Christopher D. Meeks, Greensboro, NC (US)

(73) Assignee: HONDA MOTOR CO., LTD., Tokyo (JP)

( * ) Notice: Subject to any disclaimer, the term of this patent is extended or adjusted under 35 U.S.C. 154(b) by 876 days.

(21) Appl. No.: 17/546,628

(22) Filed: Dec. 9, 2021

(65) Prior Publication Data

US 2023/0180658 A1  Jun. 15, 2023

(51) Int. Cl.

| | |
|---|---|
| *A01D 34/78* | (2006.01) |
| *A01D 34/82* | (2006.01) |
| *H01M 50/20* | (2021.01) |
| *H01M 50/204* | (2021.01) |
| *H01M 50/247* | (2021.01) |
| *H01M 50/256* | (2021.01) |

(Continued)

(52) U.S. Cl.
CPC .......... *A01D 34/82* (2013.01); *H01M 50/204* (2021.01); *H01M 50/247* (2021.01); *H01M 50/256* (2021.01); *H01M 50/262* (2021.01); *A01D 34/78* (2013.01); *A01D 2101/00* (2013.01)

(58) Field of Classification Search
CPC ...... A01D 34/82; A01D 34/78; A01D 34/828; A01D 34/74; H01M 50/247; H01M 50/204; H01M 50/256; H01M 50/262; H01M 50/244; H01M 10/0481; H01M 10/6235; B60R 16/04; Y10T 292/084; Y10T 292/0843; Y10T 292/0977; Y10T 292/0993; Y10T 292/1016; Y10T 292/1018; Y10T 292/63

See application file for complete search history.

(56) References Cited

U.S. PATENT DOCUMENTS

| | | |
|---|---|---|
| 3,999,110 A | 12/1976 | Ramstrom et al. |
| 4,632,888 A | 12/1986 | Kump et al. |
| 5,440,785 A | 8/1995 | McDonald |

(Continued)

FOREIGN PATENT DOCUMENTS

| | | |
|---|---|---|
| CN | 2451392 Y | 10/2001 |
| CN | 202990629 U | 6/2013 |

(Continued)

*Primary Examiner* — Joseph M Rocca
*Assistant Examiner* — Robert E Pezzuto
(74) *Attorney, Agent, or Firm* — KENEALY VAIDYA LLP (57) ABSTRACT

A battery system for a power equipment apparatus including a battery, a first latch and a second latch. The first latch and the second latch can be movable between a locked position where the first and second latches are configured to engage with a mating structure of the apparatus and a released position where the first and second latches are disengaged from the apparatus. A gearing assembly can be attached to the battery and driving one of the first latch and the second latch between the locked position and the released position. A spring can engage the first latch and the second latch, the spring biasing the first latch and the second latch toward the locked position.

18 Claims, 7 Drawing Sheets

(51) Int. Cl.
    *H01M 50/262*     (2021.01)
    *A01D 101/00*     (2006.01)

(56) References Cited

U.S. PATENT DOCUMENTS

| | | |
|---|---|---|
| 5,670,274 A | 9/1997 | Forrer |
| 5,819,513 A * | 10/1998 | Braun .................. A01D 34/828 56/11.9 |
| 6,499,190 B2 | 12/2002 | Ruiz Rodriguez |
| 6,682,109 B2 * | 1/2004 | Horne ....................... E05C 1/10 292/22 |
| 10,431,780 B2 | 10/2019 | Elison et al. |
| 10,446,808 B2 | 10/2019 | Elison et al. |
| 11,996,577 B2 * | 5/2024 | Müller ................ B66F 9/07531 |
| 2005/0104380 A1 * | 5/2005 | Cho ........................ E05B 83/30 292/33 |
| 2019/0288255 A1 * | 9/2019 | Kubota .................. A01D 34/78 |
| 2020/0229863 A1 | 7/2020 | Madan et al. |

FOREIGN PATENT DOCUMENTS

| | | |
|---|---|---|
| CN | 111180625 A | 5/2020 |
| EP | 2599594 B1 | 9/2017 |

* cited by examiner

BATTERY SYSTEM, POWER EQUIPMENT APPARATUS HAVING THE SAME, AND ELECTRIC LAWNMOWER

BACKGROUND

The disclosed subject matter relates to a battery system, power equipment apparatus having the same, and electric lawnmower. More particularly, the disclosed subject matter relates to a battery system that can be removably mounted in a battery receptacle.

Power equipment can be powered by an electric motor. The electric motor can rely on an external power source such as a wall outlet and can be connect to the wall outlet by an electrical cable (also referred to as an extension cord). Alternatively, power equipment having an electric motor can include an internal power supply such as a battery pack that includes one or more battery cells. Battery packs can be removable from power equipment for external charging.

SUMMARY

Some embodiments are directed to a battery system for a power equipment apparatus that can include a battery, a first latch, and a second latch. The first latch and the second latch can be movable between a locked position where the first and second latches are configured to engage with a mating structure of the apparatus and a released position where the first and second latches are disengaged from the apparatus. A gearing assembly can be attached to the battery and driving one of the first latch and the second latch between the locked position and the released position. A spring can engage the first latch and the second latch, the spring can bias the first latch and the second latch toward the locked position.

Some embodiments are directed to an electric lawnmower that can include a deck; an electric motor mounted on the deck; a battery receptacle mounted on the deck; a blade rotatably supported in the deck; a plurality of wheels connected to the deck; and a battery system electrically connected to the electric motor. The battery system can include a battery removably mounted in the battery receptacle; a first latch and a second latch, the first latch and the second latch can be movable between a locked position where the first and second latches are engaged with the battery receptacle and a released position where the first and second latches are disengaged from the battery receptacle. A gearing assembly can be attached to the battery and can drive one of the first latch and the second latch between the locked position and the released position. A spring can engage the first latch and the second latch, the spring can bias the first latch and the second latch toward the locked position.

Some embodiments are directed to a power equipment apparatus that can include a housing; a battery receptacle disposed in the housing; an electric motor disposed in the housing; an implement driven by the electric motor; and a battery system electrically connected to the electric motor. The battery system can include a battery releasably mounted in the battery receptacle; and a first latch and a second latch, the first latch and the second latch are movable between a locked position where the first and second latches are engaged with the battery receptacle and a released position where the first and second latches are disengaged from the battery receptacle. A gearing assembly can attach to the battery and can drive one of the first latch and the second latch between the locked position and the released position. A spring can engage the first latch and the second latch, and the spring can bias the first latch and the second latch toward the locked position.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

A power equipment apparatus can include internal power supply such as a battery pack that includes one or more battery cells. The battery pack can be attached or mounted to the power equipment apparatus during operation of the power equipment apparatus. However, operation of the power equipment apparatus can cause vibrations. The operating vibrations can cause the battery pack to move around relative to the power equipment apparatus and with sustained use, cause wear on the electric connectors of the battery pack. Additionally, the battery pack can become loosened or disconnected from the power equipment apparatus as a result of the wear on the electric connectors and/or the operational vibrations. Batteries that are larger in size can experience even more disconnect and wear than smaller batteries.

However, an internal power supply that can sufficiently secure to a power equipment apparatus and withstand operational vibrations may be prohibitive due to the material, the weight and/or size of the power equipment apparatus and/or battery pack.

Thus, there is a need for a battery system that can secure to a power equipment apparatus and withstand operating vibrations for sustained use. There is also a need for a battery system that can secure a battery in place without increasing the height of an internal power supply assembly.

Figure 1:
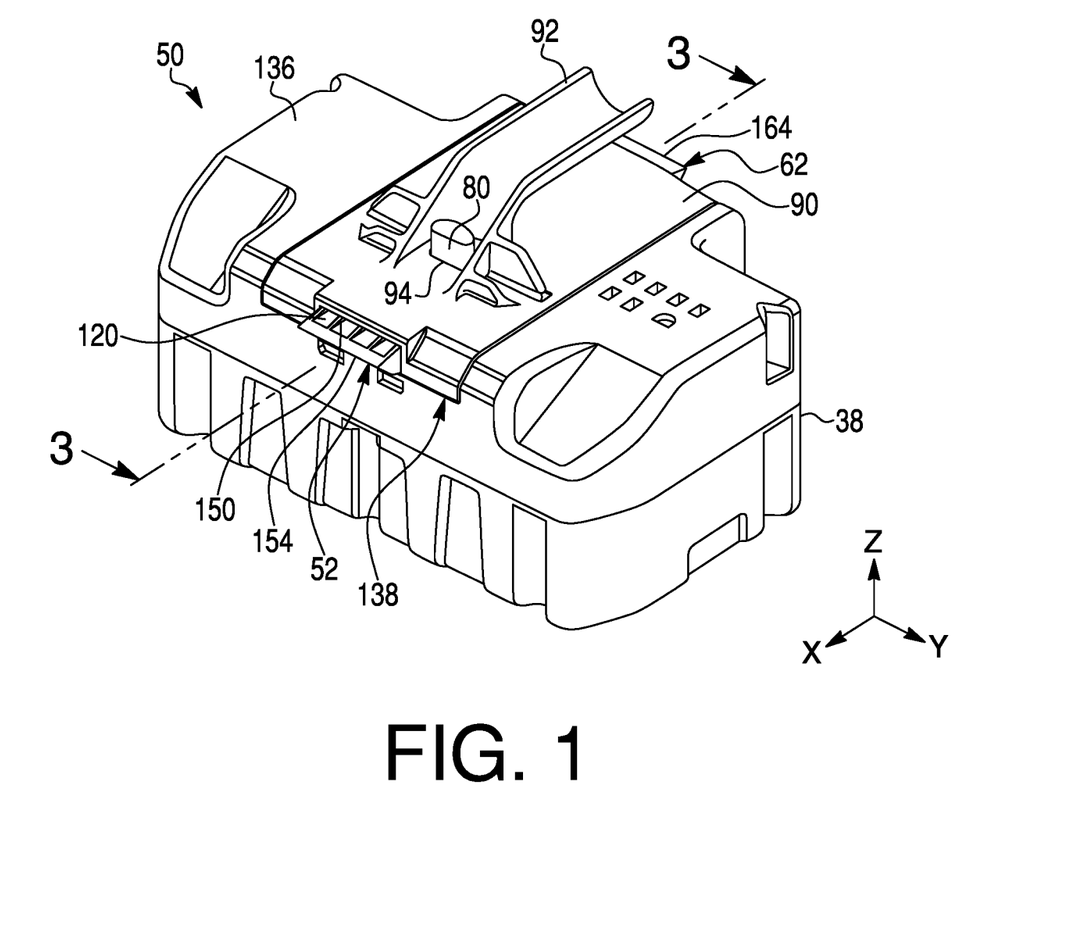
FIG. 1 is a perspective view of a battery system made in accordance with principles of the disclosed subject matter.

FIG. 1 illustrates an embodiment of a battery system 50 for a power equipment apparatus 110 made in accordance with the principles of the disclosed subject matter. The battery system 50 can be referred to as a battery assembly. The battery system 50 can include a battery 38, a first latch 52, a spring 60, a second latch 62, a gearing assembly 70, a release 80, an upper cover 90, and a battery handle 92.

The battery system 50 can include a spring-loaded, gear driven, mechanism for locking the battery 38 in a retained condition (also referred to as a locked position). The battery system 50 can use twin tapered latches 52, 62 that can push out from the battery system 50, securing the battery 38 in place while allowing a tolerance band for the stack height of the assembly. Twin pinion gears 78 of the gearing assembly 70 can allow for the two opposing spring-loaded latches 52, 62 to be retracted with a single, linear user input. All non-stationary components can be retained within a single plane, reducing the stack height of the assembly. The locking mechanism can be assembled to the battery 38, as opposed to a frame of the power equipment apparatus 110. Further details of the battery system 50 will be described below.

The battery system 50 can include a relative axis about which the battery system 50 is centered. The X direction can be referred to as the width, the Y direction can be referred to as the length, and the Z direction can be referred to as the height of the battery system 50 respectively.

Figure 2:
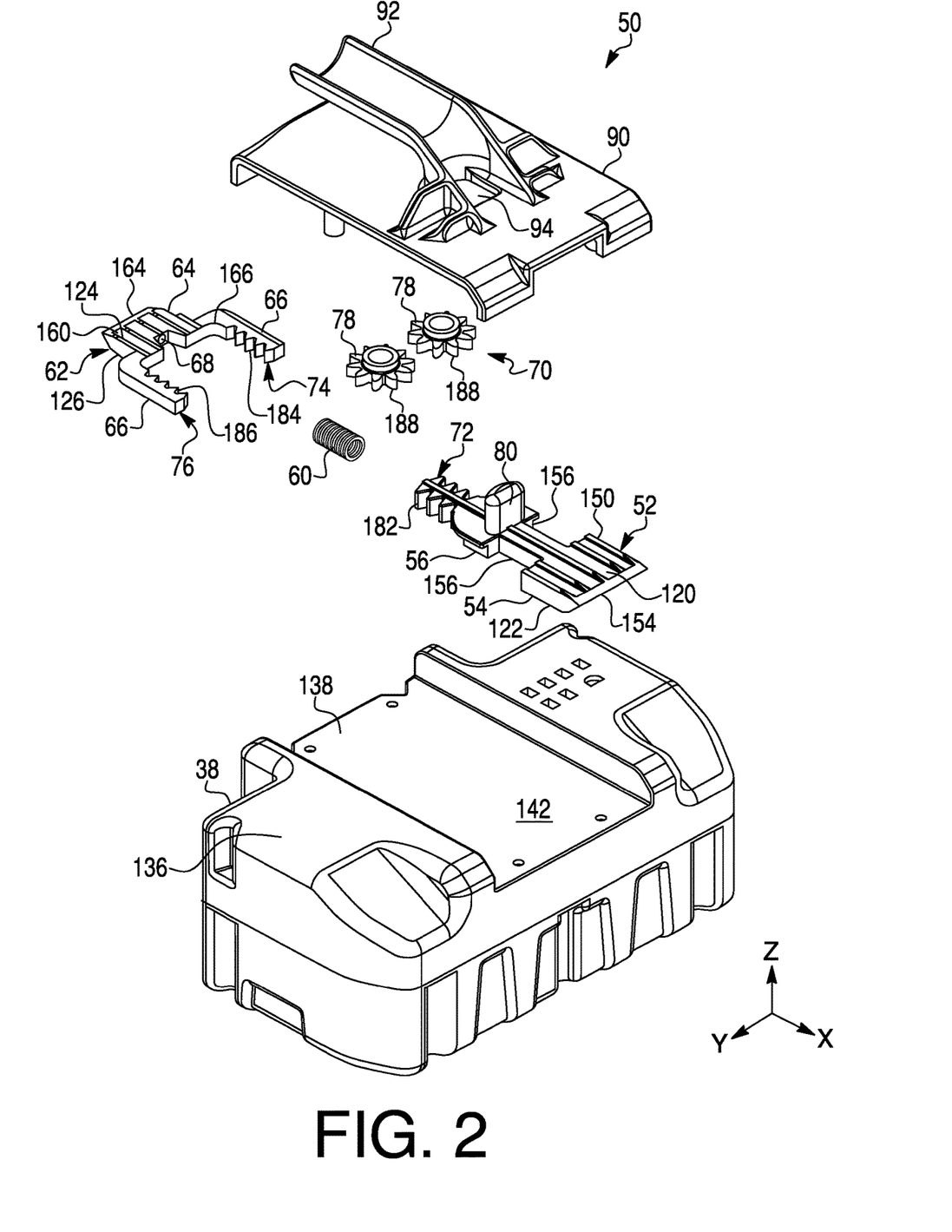
FIG. 2 is an exploded view of the battery system of FIG. 1.

FIG. 2 illustrates an exploded view of the battery system of FIG. 1.

The battery 38 can be a battery pack including at least one battery cell. A top surface 136 of the battery 38 can include a groove 138 having a flat surface 142. The groove 138 can house the first and second latches 52, 62, the gearing assembly 70, and the spring 60. A bottom surface 134 of the battery 38 can include a connection component 140 configured to electrically connect the battery 38 to a terminal 34.

The first latch 52 (also referred to as the first lock) can include a first body 54 and an actuator stem 56 extending from the first body 54. The actuator stem 56 can include a plurality of guide surfaces 156 and can have a first gear rack 72 located on the actuator stem 56. The first gear rack 72 can include first gear teeth 182 disposed on both or either side of the actuator stem 56 and extending outward from the actuator stem 56 in the Y direction. The actuator stem 56 can include a first spring post 58 at the end of the actuator stem 56. The actuator stem 56 can include a plurality of guide surfaces 156. The plurality of guides surfaces 156 can be outer surfaces of the actuator stem 56 and shaped complimentary to a first stopper 100 described in detail below.

The first body 54 can have a flat shape having a first plurality of ribs 150 on at least one of an upper surface 120 and a lower surface 122. The first body 54 can include a first tapered end 154 extending in a direction opposite from the actuator stem 56 that is on the opposite side of the first body 54 that the actuator stem 56 extends.

The second latch 62 (also referred to as the second lock) can include a second body 64 and a pair of arms 66 extending from the second body 64. A second gear rack 74 can be on at least one of the pair of arms 66. The second body 64 can include a second spring post 68 extending therefrom. The second body 64 can have a flat shape having a second plurality of ribs 160 on at least one of an upper surface 124 and a lower surface 126. The second body 64 can include a second tapered end 164 extending in an opposite direction from the pair of arms 66 and that is on the opposite side of the second body 64 that the second spring post 68 and pair of arms 66 extend. The pair of arms 66 can be parallel, or substantially parallel, to each other and can extend from the second body 64 toward the first latch 52 in the Y direction.

As shown in FIG. 2, an exemplary embodiment of the second latch 62 can include a third gear rack 76 on another one of the pair of arms 66 different than the one of the pair of arms 66 that the second gear rack 74 is disposed on. The second gear rack 74 and the third gear rack 76 can each include gear teeth 184, 186 respectively, extending from the respective one of the pair of arms 66 toward the other one of the pair of arms 66 in the Y direction.

The second latch 62 can include a second plurality of guide surfaces 166 (also referred to as inner surfaces). The guide surfaces 166 of the second latch 62 can be inner surfaces of the pair of arms 66 extending from the end of the gear teeth 184, 186 to the second body 64 at an elbow 168 of one of the pair of arms 66. The second plurality of guide surfaces 166 can be shaped complimentary to a second stopper 102 describe in detail below.

The first latch 52 and the second latch 62 can be movable between a locked position where the first and second latches 52, 62 are engaged with a mating structure 132 of the power equipment apparatus 110 and a released position where the first and second latches 52, 62 are disengaged from the apparatus 110. The first and second latches 52, 62 can movably slide along the flat surface 142 of the groove 138 of the battery 38.

The release 80 can be connected to the first latch 52 and located between the plurality of guide surfaces 156 and the first gear rack 72. The release 80 can extend from the first latch 52 in an orthogonal, or substantially orthogonal, direction from the upper surface 120 of the first latch 52. The release 80 can extend in the Z direction up through an opening 94 in the upper cover 90 so that the release 80 is exposed outside of the upper cover 90. The release 80 can abut the upper cover 90 in the X direction. In the released position, the release 80 can move toward the battery handle 92 in the X direction until it abuts the battery handle 92. The release 80 can transfer an operator's input force to move the first latch 52.

The gearing assembly 70 can be attached to the battery 38 and/or the upper cover 90 and can drive one of the first latch 52 and the second latch 62 between the locked position and the released position. An input force on the release 80 in a first direction F1 can be converted by the gearing assembly 70 to a force in a second direction F2 on the other of the first latch 52 and the second latch 62 that the release 80 is not attached to. The second direction F2 can be opposite the first direction F1. The first direction F1 can be the direction extending from the first latch 52 toward the second latch 62. Additionally, the first direction F1 and the second direction F2 can be opposite directions along the X direction.

The gearing assembly 70 can include the first gear rack 72 that is connected to the first body 54, the second gear rack 74 that is connected to the second body 64, the third gear rack 76 that is connected to the second body 64, and a pair of gears 78 engaging the first gear rack 72 and the second gear rack 74. The first gear rack 72 can drive the pair of gears 78 and the pair of gears 78 can drive the second gear rack 74 between the locked and released position. The first gear rack 72 can be disposed between the pair of gears 78 and the pair of gears 78 is disposed between the pair of arms 66. The pair of gears 78 can include gear teeth 188 that can be engaged with both the second gear rack 74 and third gear rack 76, each one of the second gear rack 74 and the third gear rack 76 located on one of the pair of arms 66, respectively. The gearing assembly 70 can be disposed between the upper cover 90 and the battery 38 in the Z direction.

The gearing assembly 70 can be attached to the battery 38 by posts 96 upon which the pair of gears 78 are rotatably mounted. The posts 96 can extend from the upper cover 90 and pass through the centers of the pair of gears 78 respectively and then attach to the battery 38. The posts 96 can allow the pair of gears 78 to spin so as to drive the second latch 62 from the locked position to the released position. The posts 96 can be any appropriate mechanical attachment device that can attach to the battery 38 and allow a gear to rotate around the post including but not limited to bearings, bolts, threaded fasteners, or other mechanical attachment devices or arrangements. In this depicted embodiment, the posts 96 that run through the gears 78 do not double as fixture devices for the upper cover to the battery 38. However, it is contemplated that these posts 96 can be modified to serve this function in other embodiments.

The spring 60 can be a coil spring mounted on the first spring post 58 and the second spring post 68. The spring 60 can engage the first latch 52 and the second latch 62 and can bias the first latch 52 and the second latch 62 toward the locked position. That is, the spring 60 can be disposed between the first latch 52 and the second latch 62 and can exert a spring force that pushes the first latch 52 and the second latch 62 away from each other. The second spring post 68 can be centered between the pair of arms 66 of the second latch 62. The first spring post 58 can be at the end of the actuator stem 56 and the first spring post 58 and the second spring post 68 can be aligned along the X direction.

The upper cover 90 can attach to the battery 38 and can cover the groove 138. The upper cover 90 can include a plurality of stoppers 98 extending from the upper cover 90 toward the battery 38. The upper cover 90 can include the opening 94 through which the release 80 protrudes. The upper cover 90 can clamp around the battery 38 or attach to the battery 38 via posts 96 or using any appropriate attachment such as, but not limited to, bolts, threaded fasteners, clamps, cotter pins, or other mechanical attachment devices or arrangements.

The battery handle 92 can protrude from the upper cover 90 in the Z direction and can be oriented along the X direction to allow an operator to exert a force in the Z direction for inserting and/or removing the battery system 50 from a battery receptacle 32. The battery handle 92 can be shaped such that an operator can grasp the battery handle 92 and actuate the release 80 simultaneously. That is, an operator can grasp the battery handle 92, press the release 80 to release the battery system 50, and lift the battery system 50 with the battery handle 92 away from the power equipment apparatus 110.

Figure 3:
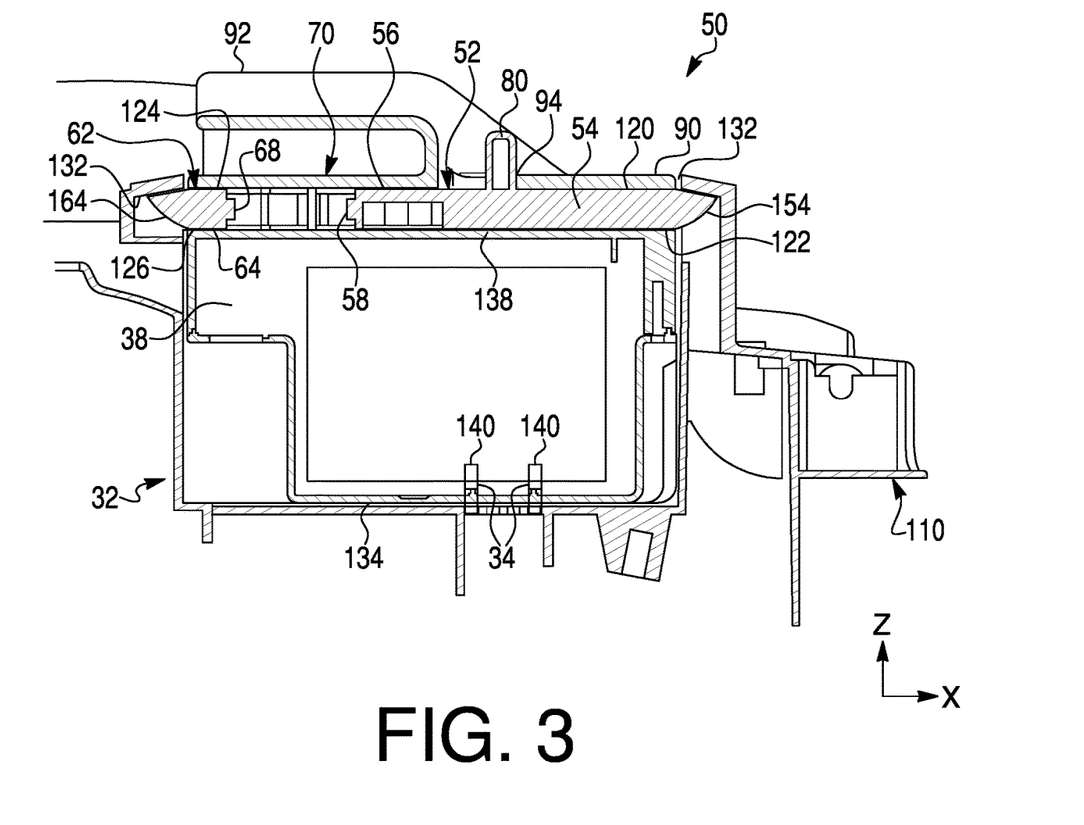
FIG. 3 is a sectional view of the battery system of FIG. 1 taken along the 3-3 line.

FIG. 3 shows a sectional view of the battery system 50 of FIG. 1 taken along the 3-3 line with the battery system 50 attached to the power equipment apparatus 110 in the locked position. The power equipment apparatus 110 can include a housing 42, the battery receptacle 32 disposed in the housing 42, an electric motor 36 disposed in the housing 42, an implement 130 driven by the electric motor 36, and the battery system 50 electrically connected to the electric motor 36.

The battery system 50 can be secured to the power equipment apparatus 110 when the battery 38 is mounted in the battery receptacle 32 and the first and second latches 52, 62 are in the locked position. The battery system 50 can be removable from the power equipment apparatus 110 when the first and second latches 52, 62 are in the released position.

The upper surface 120 of the first latch 52 can be a flat upper surface and the upper surface 124 of the second latch 62 can be a flat upper surface. The first and second flat upper surfaces 120, 124 can extend in the X direction along the width of the battery 38 until they reach the tapered ends 154, 164, respectively. The tapered ends 154, 164 can extend beyond the edge of the battery 38 and abut the mating structure 132 (also referred to as an edge of the battery receptacle 32) of the power equipment apparatus 110 in the locked position.

The tapered ends 154, 164 of the first and second latches 52, 62 can allow an operator to press the battery system 50 into the battery receptacle 32 until it reaches the locked position without actuating the release 80. Upon contact with the battery receptacle 32 the tapered ends 154, 164 can slide along the mating structure 132 of the battery receptacle 32 and can push the first and second latches 52, 62 against force of spring 60 and toward the released position thereby allowing the battery system 50 to enter into the receptacle 32. Once the battery system 50 has inserted in the receptacle 32 and the tapered ends 154, 164 have traveled past the mating structure 132 of the receptacle 32, the force bias of the spring 60 can push the first and second latches 52, 62 to the locked position and the tapered ends 154, 164 can extend in the X direction and abut the mating structure 132 of the receptacle 32.

Although the first and second flat upper surfaces 120, 124 shown in FIG. 3 include each tapered end 154 and 164 angled downward, the first flat upper surface 120 and the second flat upper surface 124 can be co-planar with each other. Each of the tapered ends 154, 164 can also be co-planar with one another (at least the outermost edges). Additionally, the first and second flat upper surfaces 120, 124 can be parallel, or substantially parallel, to the X direction.

A distance D1 can define the distance between the flat surface 142 of the groove 138 and the upper cover 90. The first latch 52, the second latch 62, the spring 60, and the gearing assembly 70 can fit between the flat surface 142 of the groove 138 and the upper cover 90 within the distance D1. That is, the height of the gearing assembly 70, the spring 60, and the first and second latches 52, 62 in the Z direction can be less than or equal to a predetermined distance D1.

The battery receptacle 32 can include the terminal 34 that can electrically connect the battery 38 to the electric motor 36. The terminal 34 can be located anywhere in the battery receptacle 32. Referring to FIG. 3, the terminal can be included on the bottom inner surface of the battery receptacle 32. The terminal 34 can connect directly to the battery 38 or can connect to the battery 38 through any appropriate electrical connection including but not limited to a contact terminal, clips, lead, terminal connector, etc.

Figure 4:
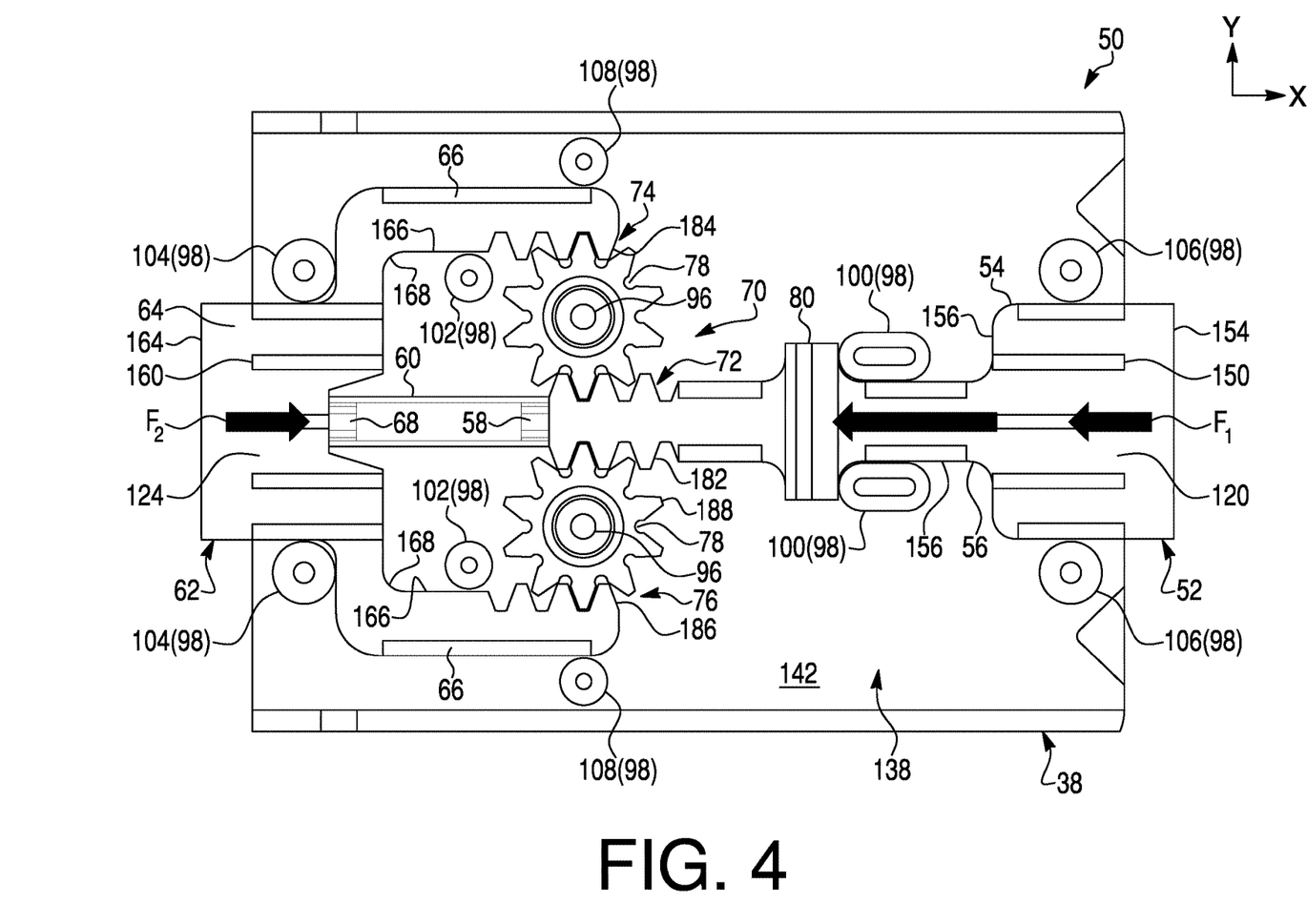
FIG. 4 is a top view of the battery system of FIG. 1 with the upper cover omitted for clarity.

FIG. 4 shows the battery system 50 viewed from above with the upper cover 90 omitted for clarity. The plurality of stoppers can be positioned on the battery 38 to align the first latch 52, second latch 62, and gearing assembly 70 on the battery 38 and to guide movement of the first and second latches 52, 62 between the locked position and released position.

The plurality of stoppers 98 (also referred to as a plurality of rollers or guides) can include at least one first stopper 100, at least one second stopper 102, at least one third stopper 104, at least one fourth stopper 106, and at least one fifth stopper 108. The plurality of stoppers 98 can limit movement of the first stopper 100 and the second stopper 102 in the X direction. The plurality of stoppers 98 can prevent movement of the first stopper 100 and the second stopper 102 in the Y direction. For example, as shown in FIG. 4, the first and second latches 52, 62 are movable along the X direction in a first direction F1 and a second direction F2. The movement of the first and second latches 52, 62 in the first and second direction F1, F2 is limited by the plurality of stoppers 98. In the Y direction, the plurality of stoppers prevent movement of the first and second latches 52, 62 in a direction orthogonal to the first and second directions F1, F2.

The first stopper 100 can have an elongated tubular cross-section and can limit movement of the first latch 52 in the first direction F1 and the second direction F2. Referring to FIG. 4, there can be a first stopper 100 disposed on either side of the actuator stem 56 and abutting the plurality of guide surfaces 156. The two first stoppers 100 can keep the actuator stem 56 aligned with the gearing assembly 70 and can prevent movement of the first latch 52 in the Y direction. The first stopper 100 can be formed to have a shape complimentary to the plurality of guide surfaces 156.

The first stopper 100 can abut the actuator stem 56 adjacent to where the release 80 extends from in the locked position. The first stopper 100 can be spaced away from where the release 80 extends from the actuator stem 56 in the released position. The first stopper 100 can slide along the plurality of guide surfaces 156 as the first latch 52 moves in a first direction F1 until the first stopper 100 abuts the first body 54 of the first latch 52 thereby preventing further movement of the first latch 52 in the first direction F1. The first stopper 100 can slide along the plurality of guide surfaces 156 as the first latch 52 moves in a second direction F2 until the first stopper 100 abuts the portion of the actuator stem 56 that the release 80 extends from thereby preventing further movement of the first latch 52 in the second direction F2.

The second stopper 102 can have a circular cross-section and can limit movement of the second latch 62 in the second direction F2. Referring to FIG. 4, there can be two second stoppers 102 disposed between the pair of arms 66 and each second stopper 102 can be on an opposite side of the spring 60 in the Y direction, respectively. The second stopper 102 can abut one of the second plurality of guide surfaces 166 of one of the pair of arms 66 between the gear teeth 184 or 186 of the respective one of the pair of arms 66 and the second body 64. The second stopper 102 can slide, or roll, along one of the second plurality of guide surfaces 166 as the second latch 62 moves from the locked position to the locked position in the second direction F2 until the second stopper 102 abuts the elbow 168 of one of the pair of arms 66.

The third stopper 104 can have a circular-cross section and can limit movement of the second latch 62 in the second direction F2. Referring to FIG. 4, there can be a third stopper 104 disposed on either side of the second body 64 of the second latch 62 in the Y direction. Each third stopper 104 can abut one of the pair of arms 66, respectively, in the locked position. As the second latch 62 moves in the second direction F2 between the locked position and the released position, the third stoppers 104 can slide, or roll, along the second body 64. As the second latch 62 moves in the first direction F1 between the released position and toward the locked position, the third stoppers 104 can slide, or roll, along the second body 64 until the third stoppers 104 abut the pair of arms 66. The pair of second stoppers 102 together can prevent movement of the second latch 62 in the Y direction thereby ensuring alignment of components of the gearing assembly 70 as the second latch 62 moves between the locked position and the released position.

The fourth stopper 106 can have a circular cross-section and can be disposed adjacent to the first body 54. Referring to FIG. 4, a fourth stopper 106 can be disposed on either side of the first body 54 and prevent movement of the first latch 52 in the Y direction. The fourth stopper 106 can slide, or roll, along the surface of the first body 54 as the first latch 52 moves between the locked position and the released position. The fifth stopper 108 can have a circular cross-section and can be disposed on an outer surface of one of the pair of arms 66. A fifth stopper 108 can be disposed on an outer surface of each of the pair of arms 66 and prevent movement of the second latch 62 in the Y direction. The fifth stopper 108 can slide, or roll, along the surface of one of the pair of arms 66 as the second latch 62 moves between the locked position and the released position.

Referring to FIG. 4, an operation of the battery system 50 moving from the locked position toward the released position is shown. A force can be applied to the release 80 in the first direction F1. The force applied to the release 80 can move the first latch 52 in the first direction F1. The first gear rack 72 located on the actuator stem 56 can drive the pair of gears 78. The driving of the pair of gears 78 can cause the pair of gears to rotate to drive the second gear racks 74 on the pair of arms 66. The driving of the second gear racks 74 can move the second latch 62 in the second direction F2. Once the first tapered end 154 and the second tapered end 164 have moved toward each other in the X direction such that the tapered ends 154, 164 are spaced away from the edge 132 of the battery receptacle 32, the battery system 50 can be removed by pulling, or lifting, the battery handle 92 outwards away from the battery receptacle 32.

Figure 5:
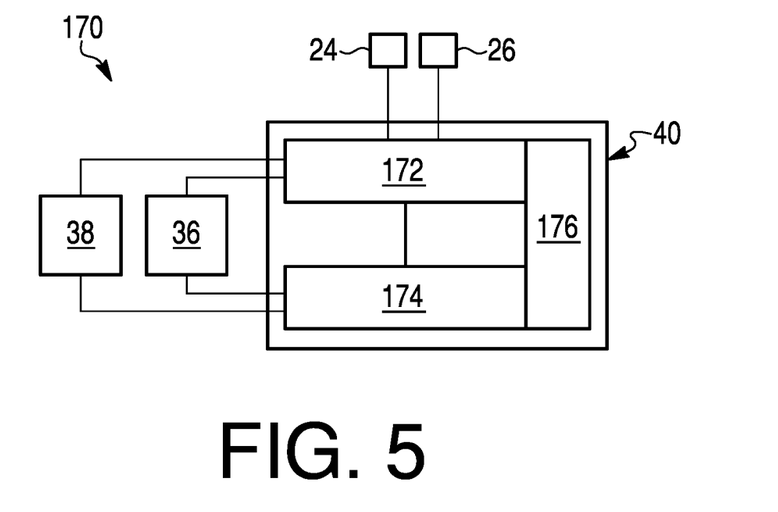
FIG. 5 is a schematic illustration of a control system for use with the battery system of FIG. 1.

An exemplary embodiment of the battery system 50 will now be described for use with the power equipment apparatus 110. FIG. 5 shows a schematic illustration of a control system 170 for the power equipment apparatus 110 for use with the battery system 50. The battery 38 can be in electrical communication with a motor driver 40 of the power equipment apparatus 110. The motor driver 40 can be in electrical communication with each of a first control assembly 24, a second control assembly 26, and the electric motor 36 of the power equipment apparatus 110. The motor driver 40 can include a controller 172, an amplifier 174 and a heat sink 176.

The controller 172 can be in electrical communication with the first control assembly 24, the second control assembly 26, the electric motor 36, the battery 38 and the amplifier 174. The controller 172 can be referred to as an electronic control unit ("ECU") or as a central processing unit ("CPU") or as a microcontroller. The controller 172 can be configured with hardware, with or without software, to perform the assigned task(s). The controller 172 can include or be electrically connected to any appropriate memory device that can store and retrieve programs and/or data for use by the controller. The controller 172 can be configured to signal the amplifier 174 to initiate, adjust or terminate supply of voltage or current from the battery 38 to the electric motor 36 based on inputs received from the control assemblies 24, 26, the battery 38 and the electric motor 36.

The amplifier 174 can be any appropriate electrical device or electronic circuit that can increase the voltage or the current supplied by the battery 38 and transmit the amplified voltage or current to the electric motor 36. The controller 172 can be configured to signal the amplifier 174 to amplify the voltage or current based on any appropriate parameter(s) such as but not limited to state of charge of the battery cell(s), state of health of the battery cell(s), battery temperature, motor temperature, and operator requested motor speed.

The controller 172 and the amplifier 174 can generate heat during operation of the electric lawnmower 10. The heat sink 176 can be thermally coupled to each of the controller 172 and the amplifier such that the heat sink absorbs at least some of the heat generated by the controller 172 and the amplifier 174. The heat sink 176 can be configured to transfer at least some of the heat absorbed from the controller 172 and the amplifier 174 to the ambient environment.

Figure 6:
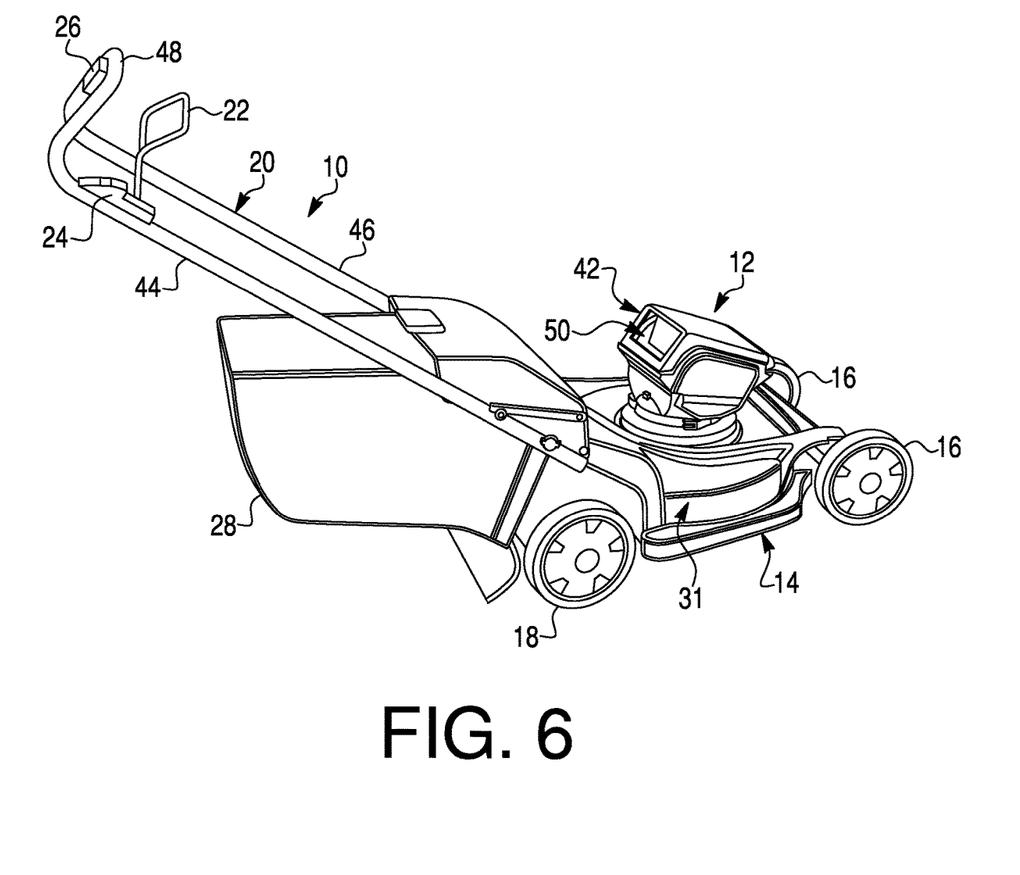
FIG. 6 is perspective view of a lawnmower including a battery system made in accordance with principles of the disclosed subject matter.

FIG. 6 is a perspective view of an exemplary embodiment of a power equipment apparatus that can be an electric lawnmower 10 made in accordance with principles of the disclosed subject matter. The electric lawnmower 10 can be an embodiment of a power equipment apparatus having an implement 130 that is a rotary implement driven to rotate by the electric motor 36. Specifically, the implement 130 of the lawnmower 10 can be a blade 30.

The lawnmower 10 can include a power source assembly 12, a deck 14, a pair of front wheels 16, a pair of rear wheels 18 (the left rear wheel is obstructed from view in FIG. 6 by the deck 14), a handle 20, a blade brake lever 22, the first control assembly 24, the second control assembly 26, a collection bag 28, a blade 30 rotatably supported in the deck 14 (obstructed from view in FIG. 6 by the deck 14), and a battery receptacle 32. The deck 14 can also be referred to as a mower deck or as a cutter deck or as a cutter housing.

Figure 7:
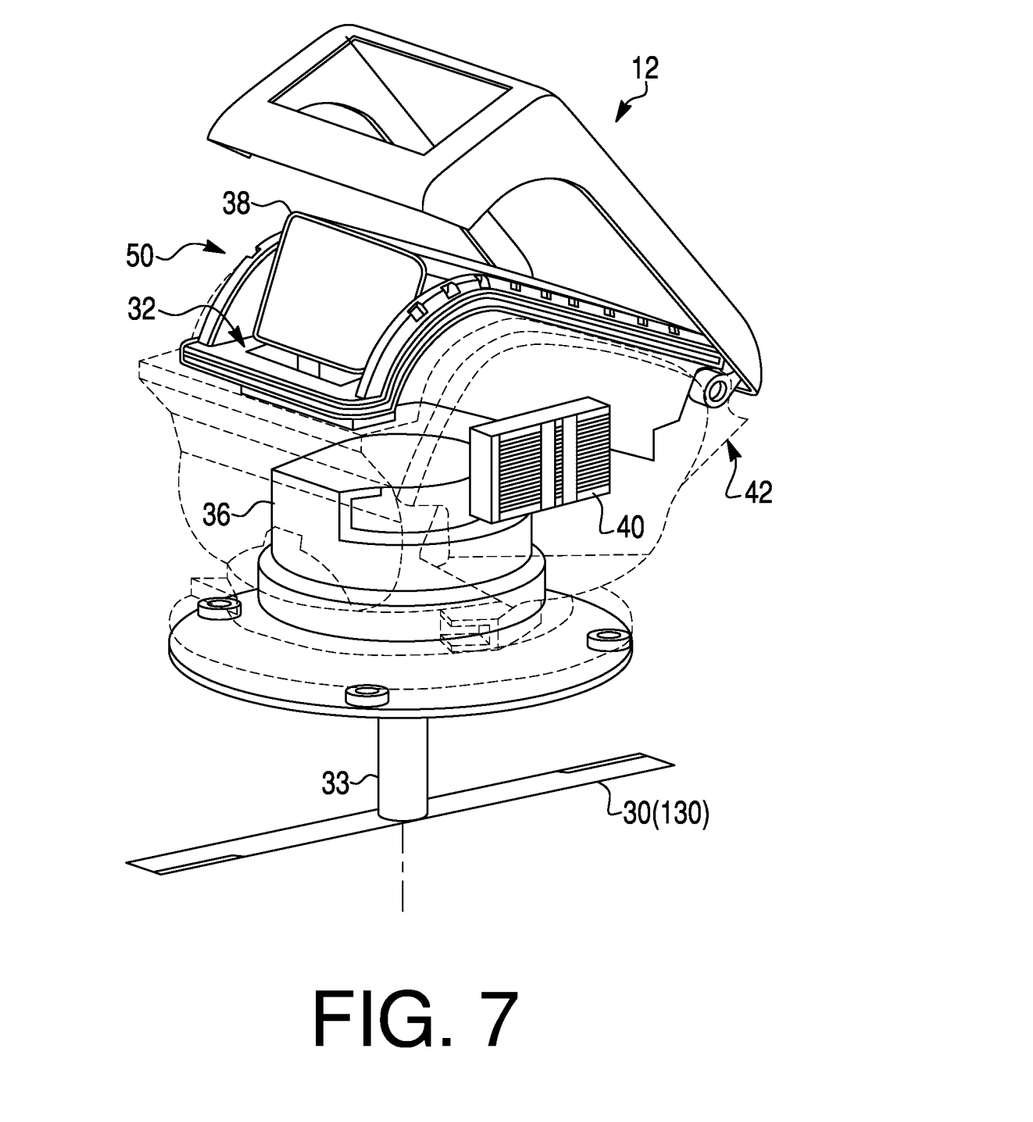
FIG. 7 is a perspective view of a power source assembly of the lawnmower of FIG. 6.

FIG. 7 is a perspective view of the power source assembly 12 of the lawnmower 10 of FIG. 6. The power source assembly 12 can include the electric motor 36, the battery 38 (schematically represented in FIGS. 6 and 7), the motor driver 40 and the housing 42. The housing 42 can be mounted to the deck 14 and can include the electric motor 36 and the battery receptacle 32. The housing 42 is shown in phantom to reveal the packaging of the electric motor 36 and the motor driver 40 inside the housing 42.

The power source assembly 12 can shield the electrical motor 36 and electronic components from an undesirable level of intrusion of dust, debris and liquids. The power source assembly 12 can also be configured to transfer to the ambient environment an advantageous amount of the heat generated by the electrical motor 36 and electronic components such that the temperature of the electrical motor 36 and electronic components can be maintained at or below a predetermined threshold temperature.

Referring to FIGS. 6 and 7, the blade 30 can be mounted in a cutting chamber 31 of the deck 14. A driveshaft 33 can be connected to each of the motor 36 of the power source assembly 12 and the blade 30. The power source assembly 12 can be configured to rotate the blade 30 inside the cutting chamber 31. The driveshaft 33 can be referred to as a component of the power source assembly 12. Alternatively, the driveshaft 33 can be referred to as a component that is connected to and driven by the power source assembly 12.

An operator of the lawnmower 10 can use the handle 20 in order to guide the path of travel of the lawnmower 10. The handle 20 can include a right extension 44, a left extension 46 and a U-shaped portion 48 that connects to and extends from each of the extensions 44, 46. The handle 20 can support the blade brake lever 22 and the control assemblies 24, 26.

The blade brake lever 22 can be pivotally mounted on the handle 20. The blade brake lever 22 can also be configured to selectively permit the power source assembly 12 to drive the blade 30 and stop rotation of the blade 30. When in the position shown in FIG. 6, the blade brake lever 22 can prevent or stop rotation of the blade 30. When pivoted toward the U-shaped portion 48, the blade brake lever 22 can permit rotation of the blade 30.

The first control assembly 24 can be mounted on the handle 20 in any appropriate position and orientation on the handle 20 that can facilitate interaction with an operator of the lawnmower 10. In the exemplary embodiment of FIG. 6, the first control assembly 24 can be mounted on the upper portion of the right extension 44 of the handle 20. The first control assembly 24 can be configured to actuate one or more operational features of the lawnmower 10. In one exemplary embodiment, the first control assembly 24 can be configured to cooperate with the blade brake lever 22 in order to signal the electric motor 36 to rotate the blade 30.

The electric motor 36 can include one or more sensors that can provide the motor driver 40 with information regarding the temperature, rotational speed, power output, etc., of the electric motor 36.

The battery 38 can be configured to supply electricity to the electric motor 36. The battery 38 can be removably mounted in the battery receptacle 32. In some embodiments, the battery 38 can be selectively removed from the housing 42 and placed in a charger assembly that is separate from the electric lawnmower 10.

The battery 38 can include one or more sensors and electronic control units in electrical communication with the motor driver 40 and each of the battery cells. The sensors and/or the electronic control unit can provide the motor driver 40 with information regarding the temperature and remaining charge of the battery 38.

The battery 38 can include a case that houses the at least one battery cell. The battery cell can be a rechargeable battery such as but not limited a lithium ion battery or a nickel-metal hydride battery or other known battery used for power equipment. The case can be made from any appropriate electrically insulating material such as but not limited to electrically insulating plastics, ceramics, or insulated metal.

The battery 38 can be a battery pack that includes any appropriate number of battery cells to achieve the desired output rating. The battery cells can be connected in series in order to provide a desired voltage or current output. Alternatively, the battery 38 can include a plurality cell groups where each cell group includes a plurality of battery cells connected in series and the cell groups are connected to each other in parallel order to provide a desired voltage or current output.

The motor driver 40 can be configured to regulate the supply of electricity from the battery 38 to the electric motor 36. When electricity from the battery 38 energizes the electric motor 36, the electric motor 36 can rotate the driveshaft 33, which rotates the blade 30 in the cutting chamber 31.

The motor driver 40 can be configured to monitor the operational conditions of the electric motor 36 and the battery 38. The motor driver 40 can be configured to control the voltage or current output by the battery 38 based on the operational conditions of the motor 36 and the battery 38.

The motor driver 40 can also be configured to amplify the voltage or current output by the battery 38, and to supply the amplified voltage or current to the electric motor 36 based on one or more inputs to the control assemblies 24, 26 by the operator of the electric lawnmower 10. Further, the motor driver 40 can be configured to supply the amplified voltage or current to the electric motor 36 based on one or more operational parameters of the electric motor and/or the battery 38.

Electrical communication lines (not numbered) can connect the controller 172 to the first control assembly 24, the second control assembly 26, the electric motor 36, the battery 38 and the amplifier 174 and in any appropriate manner. Electrical communication can be either one-way communication or two-way communication and can be networked or not networked.

ALTERNATIVE EMBODIMENTS

While certain embodiments of the invention are described above, it should be understood that the invention can be embodied and configured in many different ways without departing from the spirit and scope of the invention.

For example, embodiments are disclosed above in the context of a power equipment apparatus, specifically an electric lawnmower 10 as shown in FIG. 6. However, embodiments are intended to include or otherwise cover any type of power equipment apparatus. For example, embodiments are intended to cover power equipment apparatus having an implement that can include, but is not limited to, a string trimmer attachment, an edger attachment, a pruner attachment, a hedge trimmer attachment, a cultivator attachment, or a blower attachment. In another alternate embodiment, the power equipment apparatus can be a non-electric lawnmower, a tiller, or a snow blower. It is also contemplated that the power equipment can be a type of vehicle that uses an electric motor. However, the above alternative embodiments are merely provided for exemplary purposes, and as indicated above, embodiments are intended to cover any type of power equipment apparatus.

Embodiments are disclosed above in which the motor 36 can be an electric motor. However, embodiments are also intended to include or otherwise cover power equipment apparatus that can include an internal combustion engine, or a hybrid of an internal combustion engine and an electric motor.

Embodiments are intended to cover a release 80 that can move in any direction including the Y direction or the Z direction. In the embodiments disclosed above, the release 80 can be a protrusion extending from the first latch 52 in the Z direction. However, embodiments are intended to cover the release 80 protruding from the second latch 62. Additionally, embodiments are intended to cover or otherwise disclose other shapes and forms of the release 80 including but not limited to a button, a switch, a rotatable knob, etc.

Embodiments are disclosed above in which the posts 96 can extend from the upper cover 90 and pass through the centers of the pair of gears 78 respectively and then attach to the battery 38. However, embodiments are also intended to include or otherwise cover the posts 96 extending from the battery 38, passing through the centers of the pair of gears 78 respectively, and then attaching into the upper cover 90. Additionally, the posts 96 can extend from either the upper cover 90 and/or the battery and abut the other of the upper cover 90 and/or the battery 38 without fastening. That is, embodiments can include configurations where the posts 96 can be alignment posts and not fastening posts that join the upper cover 90 and the battery 38 together.

Embodiments are disclosed above in which the spring 60 is a coil spring. However, embodiments are also intended to include or cover other types of springs or spring members. For example, exemplary embodiments can cover a flexible member having a low stiffness that allows the latches 52, 62 to move toward and away from each other by a predetermined distance with a bias toward separating the first and second latches 52, 62.

The configuration where the latches 52, 62 are located substantially in a substantially same plane of operation allows the height or vertical characteristic (Z-direction or stack height characteristic) of the mounting and locking assembly to be minimized. A single release actuator 80 allows for easy actuation or release of the battery from the power equipment.

Exemplary embodiments are intended to include or otherwise cover any type of stopper. In other words, exemplary embodiments are intended to cover rollers, guides, posts, or other tubular shaped member extending between the surface 142 of the groove 138 and the upper cover 90. Exemplary embodiments can include stoppers 98 that extend from either the upper cover 90 or the battery 38 or a combination of stoppers, some extending from the upper cover 90 and other stoppers extending from the battery 38. Exemplary embodiments can include a mix of rotatable stoppers such as rollers and stationary stoppers that do not rotate about the axis. Exemplary embodiments can also include structural components that abut the latches rather than stoppers.

What is claimed is:

1. A battery system for a power equipment apparatus, comprising:
    a battery;
    a first latch and a second latch, the first latch and the second latch are movable between a locked position where the first and second latches are configured to engage with a mating structure of the apparatus and a released position where the first and second latches are disengaged from the apparatus;
    a gearing assembly attached to the battery and configured to drive one of the first latch and the second latch between the locked position and the released position; and
    a spring abutting the first latch and the second latch, the spring biasing the first latch and the second latch toward the locked position, wherein
    the first latch includes a first body and the second latch includes a second body,
    the gearing assembly includes a first gear rack connected to the first body, a second gear rack connected to the second body, and a pair of gears engaging the first gear rack and the second gear rack, the first gear rack configured to drive the pair of gears and the pair of gears configured to drive the second gear rack between the locked position and the released position,
    the first latch includes an actuator stem extending from the first body, the first gear rack is located on the actuator stem,
    the second latch includes a pair of arms extending from the second body, the second gear rack is on one of the pair of arms, and
    the first gear rack is disposed between the pair of gears and the pair of gears is disposed between the pair of arms.

2. The battery system of claim 1, further comprising:
    a release connected to one of the first latch and the second latch, wherein
        an input force on the release in a first direction is converted by the gearing assembly to a force in a second direction on the other of the first latch and the second latch, the second direction is opposite to the first direction.

3. The battery system of claim 1, wherein
    the actuator stem includes a plurality of guide surfaces, and a release located between the plurality of guide surfaces and the first gear rack.

4. The battery system of claim 3, wherein
    the actuator stem includes a first spring post at the end of the actuator stem,
    the second body includes a second spring post extending therefrom, and
    the spring is a coil spring mounted on the first spring post and the second spring post.

5. The battery system of claim 4, further comprising:
an upper cover attached to the battery and having an opening, the gearing assembly is disposed between the upper cover and the battery; and
a battery handle protruding from the upper cover, the release protrudes from the actuator stem through the opening.

6. The battery system of claim 4, wherein
the first latch includes a first flat upper surface,
the second latch includes a second flat upper surface, and
the first flat upper surface of the first latch is co-planar with the second flat upper surface of the second latch.

7. The battery system of claim 3, wherein
the first body includes a first tapered end extending in an opposite direction from the actuator stem, and
the second body includes a second tapered end extending in an opposite direction from the pair of arms.

8. The battery system of claim 7, further comprising:
at least one first stopper;
at least one second stopper, wherein
the at least one first stopper limits movement of the first latch in a first direction and the at least one second stopper limits movement of the second latch in a second direction that is opposite the first direction.

9. The battery system of claim 8, wherein
the at least one first stopper limits movement of the first latch in the second direction.

10. The battery system of claim 8, further comprising:
at least one third stopper that limits movement of the second latch in the first direction.

11. The battery system of claim 10, wherein
the at least one first stopper, the at least one second stopper, and the at least one third stopper each prevent movement of the first latch and the second latch in a direction orthogonal to the first direction.

12. The battery system of claim 11, wherein
the first direction is the direction extending from the first latch toward the second latch.

13. An electric lawnmower, comprising:
a deck;
an electric motor mounted adjacent the deck;
a battery receptacle mounted adjacent the deck;
a blade rotatably supported in the deck;
a plurality of wheels connected to the deck; and
a battery system electrically connectable to the electric motor, the battery system including:
  a battery removably mounted in the battery receptacle and including a groove;
  a first latch and a second latch, the first latch and the second latch are housed in the groove of the battery and movable between a locked position where the first and second latches are engaged with the battery receptacle and a released position where the first and second latches are disengaged from the battery receptacle;
  a gearing assembly housed in the groove of the battery and driving one of the first latch and the second latch between the locked position and the released position; and
  a spring engaging the first latch and the second latch, the spring biasing the first latch and the second latch toward the locked position.

14. The electric lawnmower of claim 13, further comprising:
a housing mounted to the deck, the housing contains the electric motor and includes the battery receptacle.

15. The electric lawnmower of claim 14, wherein
the battery system further includes:
  a release disposed on one of the first latch and the second latch, the release configured such that an input force on the release in a first direction is converted by the gearing assembly to a force in a second direction on the other of the first latch and the second latch, and the second direction is opposite the first direction;
  an upper cover adjacent the battery and having an opening, the gearing assembly is disposed between the upper cover and the battery; and
  a battery handle protruding from the upper cover, and the release protruding from the one of the first latch and the second latch through the opening.

16. A power equipment apparatus, comprising:
a housing;
a battery receptacle disposed in the housing;
an electric motor disposed in the housing;
an implement driven by the electric motor; and
a battery system electrically connectable to the electric motor, the battery system including:
  a battery releasably mounted in the battery receptacle;
  a first latch and a second latch, the first latch and the second latch are movable between a locked position where the first and second latches are engaged with the battery receptacle and a released position where the first and second latches are disengaged from the battery receptacle;
  a gearing assembly adjacent the battery and configured to drive one of the first latch and the second latch between the locked position and the released position;
  a spring engaging the first latch and the second latch, the spring biasing the first latch and the second latch toward the locked position; and
  a release disposed on one of the first latch and the second latch, wherein
the first latch moves in a first direction from the locked position to the released position and the second latch moves in a second direction from the locked position to the released position, the second direction is different from the first direction, and
the release is movable in the first direction and the second direction.

17. The power equipment apparatus of claim 16, wherein the implement is a rotary implement driven to rotate by the electric motor.

18. The power equipment apparatus of claim 16, wherein
the battery system is secured to the power equipment apparatus when the battery is mounted in the battery receptacle and the first and second latches are in the locked position, and the battery system is removable from the power equipment apparatus when the first and second latches are in the released position.

* * * * *